United States Patent [19]

Lorenzana

[11] Patent Number: 5,448,402
[45] Date of Patent: Sep. 5, 1995

[54] BICYCLE LIGHT REFLECTOR

[76] Inventor: Moises B. Lorenzana, 601 Lake Hinsdale Dr., Willowbrook, Ill. 60514

[21] Appl. No.: 372,007

[22] Filed: Jan. 12, 1995

[51] Int. Cl.⁶ .............................. G02B 5/12; B62J 3/00; B60Q 1/00
[52] U.S. Cl. .................................... 359/550; 359/842; 280/288.4; 248/475.1; 116/28 R
[58] Field of Search ............... 359/524, 533, 548, 549, 359/550, 839, 840, 841, 842, 871, 881; 362/72; 280/288.4; 248/475.1, 476; 116/28 R

[56] References Cited

U.S. PATENT DOCUMENTS

| | | | |
|---|---|---|---|
| 3,586,348 | 6/1971 | Rich | 359/550 |
| 3,650,544 | 3/1972 | Cassell | 116/28 R |
| 3,890,497 | 6/1975 | Rush | 359/550 |
| 3,945,336 | 3/1976 | Harris | 280/288.4 |
| 4,003,630 | 1/1977 | Kirk | 359/524 |
| 4,020,335 | 4/1977 | Bisceglsa | . |
| 4,041,452 | 8/1977 | Moya | 362/72 |
| 4,046,397 | 9/1977 | Kitrell | 359/550 |
| 4,274,127 | 6/1981 | Beck et al. | 362/72 |
| 4,321,883 | 3/1982 | Ruppa | 359/550 |
| 4,422,615 | 12/1983 | McManus | 248/475.1 |

Primary Examiner—Ricky D. Shafer
Attorney, Agent, or Firm—Neil M. Rose

[57] ABSTRACT

A bicycle light reflector which mounts on the rear axle of a bicycle and includes an upwardly extending flexible mast supporting a disc reflector at its upper end for oscillatory movement.

17 Claims, 1 Drawing Sheet

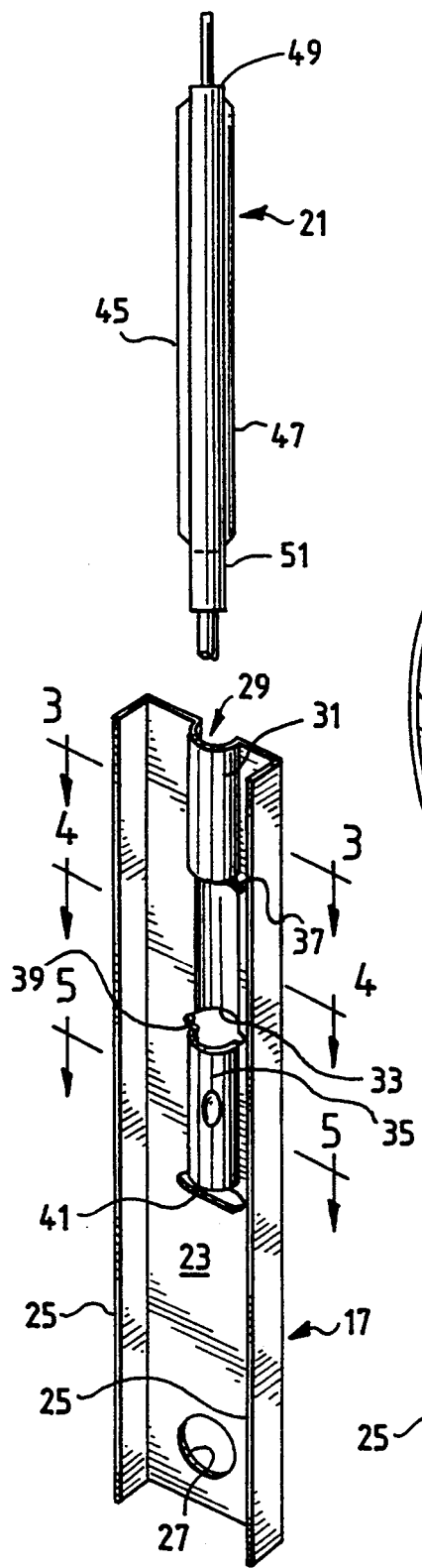
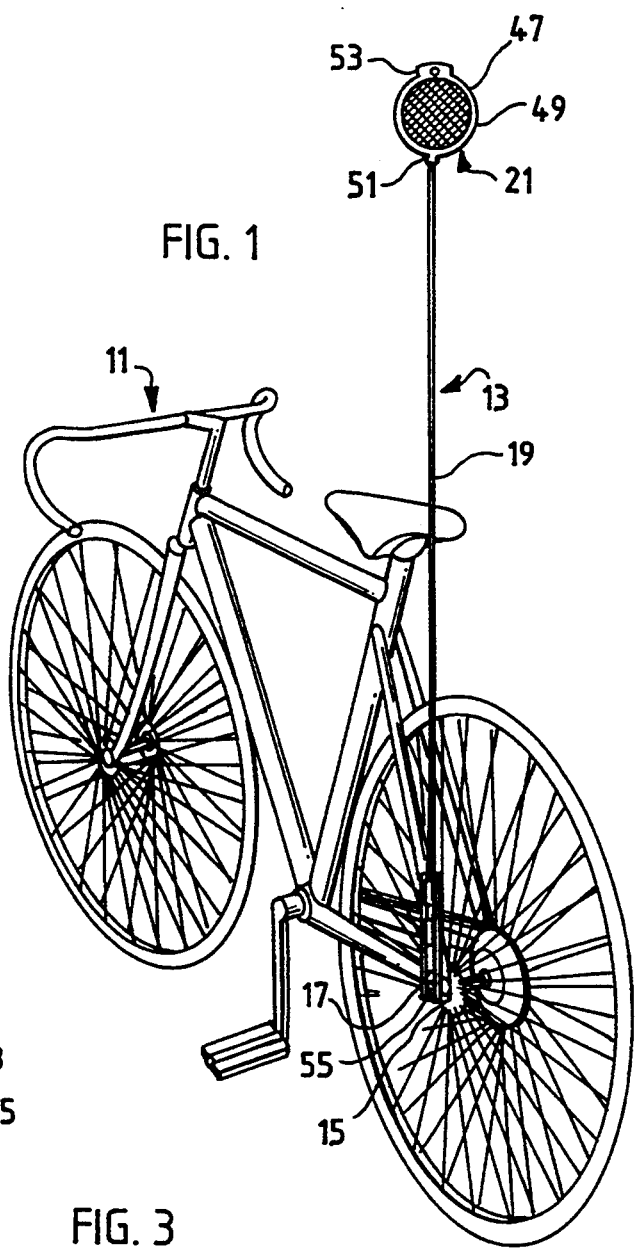
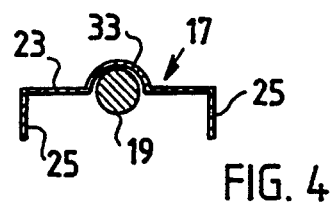
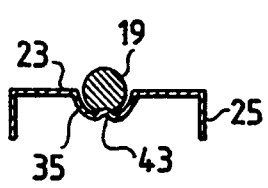

BICYCLE LIGHT REFLECTOR

BACKGROUND OF THE INVENTION

Present invention relates generally to light reflectors for use on bicycles for purposes and specifically to a light reflector mounted on a elevated support over the rear wheel of the bicycle.

With the increasing numbers of bicycles being used on the roads which are intended primarily for automobile traffic, the risks of accidents involving automobiles and bicycles have increased considerably. There are many reasons for these types of accidents but one of the primary reasons is that the driver of the automobile often does not see the biker until it is too late to avoid the accident. The biker is normally crouched over with his trunk almost horizontal thus presenting a low profile which is not able to be seen over other automobiles. In many instances, a passing automobile will not have a chance to see the biker until he is almost upon him and it is too late to take action to avoid a collision.

Another somewhat related cause, of such accidents is the lack of adequate light systems on bicycles. In contrast to automobiles, most bicycles are sold with no lighting equipment included. While the after-market provides many types of battery or generator powered lights for bicycles, most bicycle owners fail to install such lighting equipment or fail to maintain it in proper operating condition. The batteries tend to fail and not be replaced and the generator systems are difficult to maintain in operation since they rely on the generator being driven by the tire of the bicycle. In recognition of the absence or shortcomings of bicycle lighting systems, most bicycles are provided with light reflectors that are mounted on various places around the wheels and frame of the bicycle. These reflectors, particularly when mounted on the wheels are very effective indicating the present of a bicycle to a driver when he is approaching the bicycle from the side and there is no obstruction to prevent the driver seeing the reflector as it whirls around as the wheels turn.

However, the most significant problem occurs at night when the bicycle is approached from the rear. Because of the significant difference in speed between the bicycle and the automobile, this encounter from the rear occurs very suddenly. Although the disc type of light reflector is efficient, the reflection of the automobile headlights that the driver sees is from a relatively small spot which is located close to the road. Because of the low height of the rearward facing light reflector and the fact that it has no apparent motion to someone approaching from the rear, it tends to be ineffective in warning the driver of the presence of the bicycle.

In order to overcome the problem of the low profile of the bicycle and rider, it has been known in the past to provide flag kits to enable the mounting of a flag and pole on a bicycle. Typically the flag would be a bright orange flag which would be easy for a driver to see, and it would be mounted on the top of a pole sufficiently long so that the flag could be seen over automobiles which might be near or surround the biker. While such flags are effective in making the driver aware early of the presence of the bicycle during the daylight hours, they are not very effective during hours of darkness.

BRIEF SUMMARY OF THE INVENTION

The present invention provides a light reflector for a bicycle which is easily visible to an automobile driver approaching the bicycle from the rear because of the positioning of the reflector and the oscillatory movement produced by its mounting. The reflector is a flat disc type of light reflector which is mounted at the uppermost end of a flexible, whip-like mast. The lower end of the mast is supported in a passageway formed in a stamped bracket secured to the rear axle of the bicycle. The engagement between the mast and the bracket is such that the mast may be rotated by overcoming the friction fit between the mast and portion of the bracket forming the passageway. This rotational adjustment permits the position of the reflector to be adjusted to obtain the optimun reflection of the light from the headlights back into the eyes of the driver. The flexible nature of the mast and the mass of the disc type reflector produces an oscillation of the disc reflector making it more visible to the approaching driver than it would be if it were fixedly mounted on the bicycle frame or fender. The reflector disc is formed with a red reflective lens to be directed rearwardly and a white or clear reflective lens to be directed forwardly so that an approaching automobile driver may determine which direction the bicycle is heading.

The mounting bracket for the support mast is a stamped steel plate which is formed with a passageway to detachably support the mast. Means formed in the passageway engage the mast to provide some restriction to rotational and axial movement of the mast with respect to the bracket. This restriction may be overcome by manually twisting or pushing the mast axially using the reflector disc secured to the other end of the mast.

Accordingly, it is an object of the present invention to provide an improved bicycle light reflector which has improved visibility by virtue of its location and manner of mounting.

It is a further object of the present invention to provide an improved bicycle light reflector including a disc type reflector mounted at the top of a whip like mast to provide an oscillatory movement of the reflector when the bicycle is in motion.

It is still another object of the present invention to provide an improved bicycle light reflector which includes a disc type; reflector mounted on the top of a flexible mast which is supported at its lower end by a stamped bracket which provides for adjustable positioning and removal of the reflector.

BRIEF DESCRIPTION OF THE DRAWINGS

While the present invention is described with particularity in the claims annexed to and forming a part of this specification, a better understanding of the invention can be had by reference to the following description taken in conjunction with the accompanying drawings in which:

FIG. 1 is a perspective view of a bicycle equipped with the bicycle light reflector embodying the present invention;

FIG.2 is an enlarged perspective view of the mast mounting bracket of the bicycle light reflector of FIG. !;

FIG.3 is a sectional view taken on line 3—3 of FIG. 2 with the reflector support mast added;

FIG. 4 is a sectional view taken on line 4—4 of FIG. 2 with the reflector support mast added;

FIG. 5 is a sectional view taken on line 5—5 of FIG. 2 with the reflector support mast added; and FIG. 6 is a side elevational view of the reflector disc of the bicycle light reflector of FIG. 1.

DESCRIPTION OF THE PREFERRED EMBODIMENT

As shown in FIG. 1 of the drawings, there is illustrated a bicycle 11 which is shown somewhat schematically and which is equipped with a bicycle light reflector 13 embodying the present invention. While the light reflector 13 is suitable for use on any type of bicycle, the bicycle 11 illustrated in FIG. 1 is termed a racing type and the light reflector 13 is adapted to be mounted on a threaded end of a rear axle 15 which may be found on almost every bicycle.

The bicycle reflector 13 comprises three basic parts, a mounting bracket 17, a support mast 19 and a reflector disc 21. The parts are designed and assembled together in such a way as to provide safety light reflector for a bicycle which is very effective in warning an automobile driver of the presence of the bicycle. This effectiveness is enhanced by the location of the reflector disc and the mounting which causes it to oscillate so that it becomes much more noticeable than a fixed reflector.

The support mast or post 19 is made of a fiberglass material and is of a length and diameter to provide a flexible and whip like character. In the preferred embodiment of the invention, the mast was 36 inches in length and ¼ inch in diameter which provided the desired flexure characteristics and positioned the reflector disc 21 at the desired height as will be explained in greater detail below. When the mast is subjected to a lateral load at one end it flexes about ½ inch for each ounce of load. Under the normal conditions of use on a bicycle over normal terrain, the mast 21 flexes or oscillates through a 6 to 8 inch arc at the upper end. Although the ¼ inch diameter mast has sufficient resilience to bend or deflect laterally a considerable distance and not be permanently deformed, it is desirable that the mast 21 not deflect substantially during normal use or it would be a hazard to passing pedestrians or vehicles or other bikers. By selecting a diameter and length which limits the deflection in normal use to 6 to 8 inches, the chances of injury to persons or property by the bicycle reflector is virtually eliminated.

To understand the construction and design of the mounting bracket 17, reference should be made to FIGS. 2 to 5 of the drawings. The mounting bracket 17 is a one piece stamped metal part having a central plate portion 23 extending between lengthwise extending turned up edges 25 which together form an elongated channel shaped member which is adapted to be secured at its lower end to the axle 15 of the bicycle 11, the axle 15 extending through an opening 27 formed in the central plate portion 23.

The upper portion of the mounting bracket 17 which is remote from the mounting opening 27 is formed to provide a passageway 29 to receive and mount the mast 19. The passageway is formed by an upper channel 31, a middle channel 33 and a lower channel 35, the channels being separated by pierced slots 37 and 39 which allow the channels to be formed in opposite directions with respect to the central portion 23 from which the channels are formed. As is best shown in FIG. 2, the upper channel 31 and the lower channel 35 are formed inwardly in to the space between the edges 25. The middle channel 33 is formed outwardly as is evident from FIG. 4 so that the three channels form the passageway 29 with the channels engaging opposite halves of the lower end of the mast 19. A third slot 41 is formed in the central plate portion 23 immediately below the lower channel 35. The lower edge of the slot 41 serves as a stop to engage the lower end of the mast 19 and defines the end of the passageway 29.

To provide a readily controlled frictional engagement between the mounting bracket 17 and the mast 19, the lower channel 35 is formed with an inwardly directed dimple which engages and interferes with the mast 19. Since it is almost impossible to control the tolerances of the channels 31, 33 and 35 closely enough to obtain the frictional engagement to allow limited movement of the mast 19 while still gripping it tightly, the use of the dimple provides a more easily controlled frictional restraint between the mounting bracket 17 and the mast 19. For reasons to be discussed below, it is important that the mast 19 be tightly gripped by the bracket 17 but also that it be possible to manually rotate mast 19 to adjustably position the reflector disc 21 and to manually detach the mast 19 from the mounting bracket 17.

Secured permanently to the upper end of the mast 19 is the disc type reflector or reflector disc 21 which is a commercially available three inch diameter light reflector manufactured to Department of Transportation standards for such safety light reflectors. The disc reflector 21 includes a front lens 45 and a rear lens 47 which are supported in a back to back relationship by a plastic frame 49. The frame encircles the lenses which are sealed together around their peripheries to prevent moisture from entering the space between the two lenses. The lenses are somewhat dish shaped with flat outer faces and molded inner surfaces providing many angled light reflecting surfaces as is well known in the art. The forward facing lens 45 is white or clear plastic, while the rearwardly facing lens 47 is red in color. The frame 49 is circular except for a base portion 51 which receives the upper end of the mast 19 and an apertured tab extension 53 which serves to hang the light reflector on a merchandising display stand.

To best understand the improved visibility provided by the bicycle light reflector of the present invention, it is necessary to review the manner in which it functions under normal conditions of use. The light reflectors are most effective if the line of sight is normal to the plane of the reflector lens. The overall length of the mast, bracket and disc reflector in the preferred embodiment is about 42 inches. This height above the ground places the disc reflector 21 within the normal line of sight of a driver, it being acknowledged that there are physical differences in the drivers and their automobiles that make height of a driver's eyes above the road vary considerably. However, with the center of the disc reflector 21 being disposed about 41 inches above the bicycle axle, the white reflector side 45 is easily seen above the back of the biker when viewed from the front and the red reflector 47 is easily visible from the rear. With the reflectors located substantially level with eyes of the driver, the reflectors produce the maximum light to the driver.

The oscillatory movement of the disc reflector is a result of the flexibility of the mast 19, the weight and momentum of the disc reflector 21 and the characteristics of the moving bicycle. There is some swaying and side-to-side movement of the bicycle as the pedals are operated and the balance maintained by the operator. In addition, the discontinuities in the road or bike path cause further vertical and lateral movement of the bicycle. The light reflector 21 has a mass of about 1 and ½ ounces which is mounted at the top end of the flexible mast 19. Tests on the described embodiment of the invention revealed that the movement of the bicycle in use and the flexibility of the mast would result in a 6 to 8 inch oscillation or side-to side movement of the disc reflector. While it is contemplated that the flexibility of the mast may be modified within the purview of the invention, the mast should be stiff enough to prevent the normal oscillation from exceeding 12 inches. Oscillation beyond 12 inches would present risks to persons and property adjacent to the biker's path and would serve little purpose. This 6 to 8 inches of oscillatory of movement in the disc reflector causes the reflection of the headlights of an automobile to produce very dramatic and distinctive display of reflected light. This display is enhanced to some degree by the fact that the angular disposition of the face of the lens changes slightly as the disc reflector 21 oscillates.

The need for the adjustable and detachable connection between the mast 19 and the mounting bracket 17 relates to the marketing as well as the use of the device. For shipping and merchandise display purposes the bicycle light reflector 13 must preferably have the disc reflector 21 and the central plate portion 23 of the mounting bracket disposed in a coplanar relationship. However, when the mounting bracket 17 is secured to the axle 15 by a nut 55 which threads onto the axle end and against the central portion 23 of the bracket 17, the disc reflector must be rotated 90 degrees so that the face of the lens 47 faces rearwardly. Thus, in mounting the light reflector 13, the mounting bracket 17 is fitted to the axle extension with the extension extending through the opening 27 with the edges 25 extending away from the bicycle. After the nut 55 is tightened against the central plate portion 23 of the mounting bracket 17, the disc reflector 21 may be rotated by turning the mast 19 by overcoming the frictional forces created by the engagement with the dimple 43. In addition, if it is necessary to readjust the reflecting angle of the disc reflector 21, this adjustment may be readily made by manually rotating the mast 19.

There may be many occasions in which it may be desirable to detach the mast 19 from the bicycle 11. It would be difficult to store the bicycle or carry it on a automobile bicycle carrier with the mast assembled to the bicycle. Further, there may be instances when the bicycle is being stored outside in a bike rack when it would be preferable to detach the mast to avoid its being stolen. In any of these instances, the mast 19 may be readily removed from the mounting bracket 17 by simply manually withdrawing the mast 19 axially overcoming the frictional forces produced by the dimple 43.

The use of the large diameter reflector lenses is an important aspect of the effectiveness of the device. Typical light reflectors used on bicycles are small, on the order of 1 and ½ inches in diameter, whereas a three inch diameter disc reflector is used in the preferred embodiment of the invention. This larger size creates a more visibly striking effect with the large reflector oscillating back and forth.

The bicycle of the present invention provides a significant improvement in the visibility of light reflective safety warning devices for use at night on bicycles. The design and construction with the flexible mast provides an attention drawing display of reflected light as the disc reflector oscillates laterally well above the top of the bicycle. The simple mounting bracket allows for rotational adjustment of the mast as well as easy attachment and detachment of the mast.

What is claimed and desired to be secured by Letters Patent of the United States is:

1. A bicycle light reflector for use on a bicycle having a front wheel and a rear wheel with the rear wheel being supported by an axle having a threaded laterally extending end comprising:
   a reflector support bracket having means for mounting said bracket on a laterally extending axle with an axle nut, said bracket being elongated and having a lower end containing said mounting means and an upper end formed with a lengthwise extending passageway which has a mouth opening upwardly;
   a flat disc light reflector having a light reflecting lens and a circular support frame;
   a flexible mast having a lower end received in said passageway and an upper end on which said flat disc light reflector is mounted, said mast having a length and flexibility so that that as mounted on a bicycle in use the weight of said disc light reflector causes said light reflector to oscillate laterally from side to side a distance of on the order of 6 to 12 inches.

2. The combination of claim 1 wherein said mast comprises a fiberglass rod having a length of on the order of 36 inches and having a flexibility characterized by being deflected by a lateral load at one end an amount equal to substantially one half an inch for each ounce of load.

3. The combination of claim 2 wherein said mast is on the order of ¼ inch in diameter and said disc light reflector has a mass of about one and one half ounces.

4. The combination of claim 3 wherein said support bracket is formed with frictional engagement means in said passageway to grip said mast and restrain said mast against axial and rotational movement with respect to said support bracket.

5. The combination of claim 4 wherein said passageway is made up of oppositely formed channel shaped portions spaced lengthwise of said bracket and engaging opposite halves of the lower end of said mast.

6. The combination of claim 5 wherein said frictional engagement means comprises a dimple formed in one of said channel shaped portions and extending into said passageway to engage said mast.

7. The combination of claim 1 wherein said disc light reflector includes a pair of flat circular lenses secured together at their peripheries to reflect light forwardly and rearwardly of a bicycle, the forwardly reflecting lens being of clear plastic and the rearwardly reflecting lens being of a red plastic.

8. A bicycle light reflector adapted for mounting on the rear axle of a bicycle, the combination comprising:
   a mounting bracket being an elongated plate with spaced parallel edges extending lengthwise to provide a rigid channel shaped configuration, said bracket having a lower end formed with an opening to receive the end of a bicycle axle for supporting said bracket, said plate having a central portion between said edges which is generally flat, said central portion of said bracket having at least two aligned openings with portions of said central portion aligned with said openings being displaced to form a passageway extending lengthwise of said bracket;

a flexible rod having a length on the order of 3 feet with a disc shaped light reflector secured to a first end of said rod, said rod having a second end received in said passageway formed in said mounting bracket, a dimple formed in one of said displaced portions of said bracket to engage said rod to restrain said rod against rotation with respect to said bracket but to allow adjustable positioning of said reflector with respect to said bracket.

9. The combination of claim 8 wherein said rod is made of fiberglass and is of such flexibility that the motion of a bicycle and the weight of said disc reflector produce an oscillatory motion in said disc reflector.

10. The combination of claim 9 wherein the oscillatory motion is on the order of six to ten inches.

11. The combination of claim 9 wherein said disc reflector includes a pair of flat circular lenses secured together at their peripheries to reflect light forwardly and rearwardly of a bicycle, the forwardly reflecting lens being of a clear plastic and the rearwardly reflecting lens being of a red plastic.

12. A bicycle light reflector comprising:

a disc reflector having two generally flat circular lenses secured together at their peripheries and being mounted in a circular frame member;

an elongated flexible fiberglass rod having a first end secured to said circular frame member to mount said disc reflector with said rod extending radially with respect to said circular frame member; and a mounting bracket having means for securing said bracket to a bicycle at a position adjacent to the rear axle of the bicycle, said bracket being formed with a passageway directed upwardly when secured to a bicycle, said passageway receiving a second end of said rod to support said rod in a vertical position, said bracket being in frictional engagement with said second end of said rod to restrain said rod from rotational and axial movement with respect to said bracket, the flexibility of said rod combined with the mass of said disc reflector and the motion of said bicycle causing said disc reflector to oscillate from side to side a distance of from 6 to 12 inches.

13. The combination of claim 12 wherein said rod is on the order of three feet in length and ¼ inches in diameter.

14. The combination of claim 13 wherein the mass of said disc reflector is on the order of an ounce and a half.

15. The combination of claim 12 wherein said mounting bracket comprises an elongated plate with turned up lengthwise extending edges to form a channel shaped member with a mounting opening at one end and said passageway extending inwardly from the other end.

16. The combination of claim 15 wherein said passageway is made up of oppositely formed channel shaped portions spaced lengthwise of said bracket engaging opposite halves of the second end of said rod.

17. The combination of claim 15 wherein one of said circular lenses is of a clear plastic and the other lens is formed of a red plastic.

* * * * *